(12) United States Patent
Handfield et al.

(10) Patent No.: US 9,022,394 B2
(45) Date of Patent: May 5, 2015

(54) SNOWMOBILE STEERING SKI

(71) Applicant: Kimpex Inc., Drummondville (CA)

(72) Inventors: Robert Handfield, St-Lucien (CA);
Robert Bessette, Drummondville (CA)

(73) Assignee: Kimpex Inc., Drummondville, Quebec (CA)

( * ) Notice: Subject to any disclaimer, the term of this patent is extended or adjusted under 35 U.S.C. 154(b) by 0 days.

(21) Appl. No.: 13/783,938

(22) Filed: Mar. 4, 2013

(65) Prior Publication Data

US 2013/0228988 A1    Sep. 5, 2013

Related U.S. Application Data

(60) Provisional application No. 61/606,110, filed on Mar. 2, 2012.

(51) Int. Cl.
*B62M 27/02* (2006.01)
*B62B 17/02* (2006.01)

(52) U.S. Cl.
CPC ............ *B62B 17/02* (2013.01); *B62M 27/02* (2013.01); *B62M 2027/025* (2013.01)

(58) Field of Classification Search
CPC .. B62B 17/02; B62M 27/02; B62M 2027/025
USPC .................................................. 280/28, 609
See application file for complete search history.

(56) References Cited

U.S. PATENT DOCUMENTS

| 2,883,204 | A | * | 4/1959 | Tomasovich | 280/13 |
| 3,408,086 | A | * | 10/1968 | Bennett | 280/604 |
| 3,632,126 | A | * | 1/1972 | Shorrock | 280/28 |
| 3,718,341 | A | * | 2/1973 | Westberg | 280/28 |
| 3,720,421 | A | * | 3/1973 | Clemmer | 280/28 |
| 3,732,939 | A | * | 5/1973 | Samson | 280/28 |
| 3,817,544 | A | * | 6/1974 | Labelle | 280/28 |
| 3,844,367 | A | * | 10/1974 | Flohr | 280/28 |
| 3,850,440 | A | * | 11/1974 | Reedy et al. | 280/28 |
| 3,856,318 | A | * | 12/1974 | Hollenbeck | 280/28 |
| 3,857,578 | A | * | 12/1974 | Alton | 280/28 |
| 3,870,331 | A | * | 3/1975 | Cryderman | 280/28 |
| 3,877,713 | A | * | 4/1975 | Mabie et al. | 280/28 |
| 4,108,453 | A | * | 8/1978 | Lavalier | 280/28 |
| 4,595,211 | A | * | 6/1986 | Fitzpatrick | 280/28 |
| 4,974,868 | A | * | 12/1990 | Morris | 280/609 |
| 5,040,818 | A | * | 8/1991 | Metheny | 280/609 |
| 5,135,249 | A | * | 8/1992 | Morris | 280/609 |

(Continued)

*Primary Examiner* — Hau Phan
*Assistant Examiner* — Jacob Meyer
(74) *Attorney, Agent, or Firm* — Robert Brouillette; Brouillette & Partners

(57) ABSTRACT

A snowmobile steering ski comprises a longitudinally extending body having a front portion, a central portion, a rear portion, a top surface configured to be secured to a snowmobile, and a bottom running surface configured to travel or glide over snow. The steering ski comprises at least one keel blade typically removably mounted to the body and downwardly extending from the bottom surface and generally extending longitudinally along at least a portion of the bottom surface. The bottom surface is further slightly upwardly arched, generally along the central portion thereof, such that the bottom surface defines a generally front pressure zone and a generally rear pressure zone. The rear pressure zone is located longitudinally behind the at least one keel blade, and is configured for substantially filling the trace(s) formed in the snow by the at least one keel blade such that the steering ski leaves little or no trace(s) in its wake.

36 Claims, 11 Drawing Sheets

(56) References Cited

U.S. PATENT DOCUMENTS

| | | | |
|---|---|---|---|
| 5,222,749 A * | 6/1993 | Bergstrom | 280/28 |
| 5,344,168 A * | 9/1994 | Olson et al. | 280/28 |
| 5,443,278 A * | 8/1995 | Berto | 280/28 |
| 5,673,772 A * | 10/1997 | Martin | 188/6 |
| 5,700,020 A * | 12/1997 | Noble | 280/28 |
| 5,836,594 A * | 11/1998 | Simmons | 280/28 |
| 6,012,728 A * | 1/2000 | Noble | 280/28 |
| 6,086,101 A * | 7/2000 | Cormican | 280/809 |
| 6,102,413 A * | 8/2000 | Khennache et al. | 280/28 |
| 6,105,979 A * | 8/2000 | Desrochers | 280/28 |
| 6,276,699 B1 * | 8/2001 | Simmons et al. | 280/28 |
| 6,378,889 B1 * | 4/2002 | Moriyama et al. | 280/609 |
| 6,382,658 B1 * | 5/2002 | Stubblefield | 280/609 |
| 6,513,612 B2 * | 2/2003 | Moriyama et al. | 180/182 |
| 6,520,512 B1 * | 2/2003 | Lachance | 280/28 |
| 6,974,139 B2 * | 12/2005 | Lund | 280/28 |
| 6,991,056 B2 * | 1/2006 | Roberts et al. | 180/182 |
| RE39,012 E * | 3/2006 | Noble et al. | 280/28 |
| 7,017,695 B2 * | 3/2006 | Meunier et al. | 180/182 |
| 7,090,229 B2 * | 8/2006 | Monsrud et al. | 280/28 |
| 7,185,897 B2 * | 3/2007 | Musselman | 280/28 |
| 7,264,250 B2 * | 9/2007 | Lachance | 280/28 |
| 7,287,763 B1 * | 10/2007 | Beaudoin | 280/28 |
| 7,413,197 B2 * | 8/2008 | Haruna et al. | 280/28 |
| 7,487,974 B2 * | 2/2009 | Dick et al. | 280/28 |
| 7,487,975 B2 * | 2/2009 | Pryputniewicz | 280/28 |
| 7,497,447 B2 * | 3/2009 | Musselman | 280/28 |
| 8,356,822 B2 * | 1/2013 | Mcleod et al. | 280/14.22 |
| 8,459,663 B2 * | 6/2013 | Pryputniewicz | 280/28 |
| 8,641,055 B2 * | 2/2014 | Simmons et al. | 280/28 |
| 2002/0041080 A1 * | 4/2002 | Moriyama et al. | 280/609 |
| 2002/0074752 A1 * | 6/2002 | Noble | 280/28 |
| 2002/0105166 A1 * | 8/2002 | Lemieux | 280/609 |
| 2003/0024751 A1 * | 2/2003 | Lebreux | 180/182 |
| 2003/0034619 A1 * | 2/2003 | Bergstrom | 280/28 |
| 2004/0160026 A1 * | 8/2004 | Lund | 280/28 |
| 2004/0227312 A1 * | 11/2004 | Dick et al. | 280/28 |
| 2005/0017465 A1 * | 1/2005 | Bergstrom | 280/28 |
| 2005/0173873 A1 * | 8/2005 | Ruzewski et al. | 280/28 |
| 2005/0280224 A1 * | 12/2005 | Monsrud et al. | 280/28 |
| 2006/0076742 A1 * | 4/2006 | Scholl | 280/28 |
| 2007/0090614 A1 * | 4/2007 | Pryputniewicz | 280/28 |
| 2007/0216114 A1 * | 9/2007 | Simmons et al. | 280/28 |
| 2008/0272575 A1 * | 11/2008 | Olson et al. | 280/609 |
| 2011/0079970 A1 * | 4/2011 | Pryputniewicz | 280/28 |
| 2012/0256382 A1 * | 10/2012 | Simmons et al. | 280/28 |

* cited by examiner

SNOWMOBILE STEERING SKI

CROSS-REFERENCE TO RELATED APPLICATIONS

The present patent application claims the benefits of priority of U.S. Provisional Patent Application No. 61/606,110, entitled "Snowmobile Steering Ski" and filed at the United States Patent and Trademark Office on Mar. 2, 2012, the content of which is incorporated herein by reference.

FIELD OF THE INVENTION

The present invention generally relates to snowmobiles and more particularly to snowmobile steering skis.

BACKGROUND OF THE INVENTION

Steering a snowmobile is typically accomplished by a pair of steering skis pivotally attached to the front of the snowmobile. The steering skis glide over the surface of the snow and may be angularly turned from side-to-side in response to movement of a handlebar grasped by a user. The snowmobile generally follows in the direction the steering skis are pointed.

Under most snow conditions steering skis, when turned, have a tendency to slide sideways, i.e. "plow" forward over the surface of the snow rather than tracking as intended. The turning radius of the snowmobile thus becomes larger than anticipated, and may result in "understeering". This phenomenon generally increases as the speed of the snowmobile increases.

Various methods have been employed to lend increased predictability and control to snowmobile steering skis. One of the most common methods is the inclusion of one or more longitudinal keels along the underside or running surface of the steering ski. The keel generally cuts or bites into the surface of the snow and enhances steering characteristics of the skis. Some keels can also be further provided with a metallic wear bar to reduce the wear on the keel and to extend its life.

However, steering skis equipped with keel(s) leave a more or less deep impression, or trace, in the snow corresponding to the profile of the ski, keel(s), and metallic wear bar(s). Particularly in wet and/or compacted snow, a steering ski coming upon the impression left by a previous steering ski will tend to follow the same track, especially if the temperature has dropped, causing the wet snow to freeze. This effect is generally known as "darting". Darting forces the snowmobile user to compensate or correct for the darting by countersteering the snowmobile to maintain directional stability. Darting can sometimes be quite severe, particularly if the snow containing the initial track was wet and has refrozen (such as on a sunny winter day followed by a cold night, which is typical snowmobiling weather).

Yet, despite considerable developments in the field of snowmobile steering skis, the problem of darting has still not been properly addressed. There is thus a need for a snowmobile steering ski which at least mitigates the problem of darting.

SUMMARY OF THE INVENTION

A snowmobile steering ski, in accordance with the principles of the present invention, generally comprises a longitudinally extending body comprising a front portion, a central portion, a rear portion, a top surface configured to be secured to a snowmobile, and a bottom running surface configured to travel or glide over snow.

The steering ski also generally comprises at least one keel blade downwardly extending from the bottom surface and generally extending longitudinally along at least a portion of the bottom surface.

The bottom surface is also slightly upwardly arched, generally along the central portion thereof, such that the bottom surface defines a generally front pressure area or region and a generally rear pressure area or region. The rear pressure area is typically located longitudinally behind the at least one keel blade.

The rear pressure area is generally configured to apply pressure on the snow over which the ski is travelling in order to substantially fill the trace(s) formed in the snow by the at least one keel blade such that the steering ski leaves little or no trace in its wake Understandably, the ability of the rear pressure area to fill back the trace(s) or impression left by the at least one keel blade will vary according to several parameters such as the speed of the snowmobile, the exterior temperature, the type of snow, the wetness of the snow, etc.

In typical though non-limitative embodiments, the at least one keel blade is removably mounted to the ski.

In typical though non-limitative embodiments, the at least one keel blade is significantly thin (e.g. between 0.125 and 0.5 inch) with respect to the overall width of the ski (e.g. several inches).

In typical though non-limitative embodiments, the ratio of the width of the at least one keel blade to the overall width of the ski is less then 15%, typically less than 10%, sometimes less than 5%.

In typical though non-limitative embodiments, the at least one keel blade is made from metallic material (e.g. stainless steel).

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel snowmobile steering ski will be described hereinafter. Although the invention is described in terms of specific illustrative embodiments, it is to be understood that the embodiments described herein are by way of example only and that the scope of the invention is not intended to be limited thereby.

Figure 1:
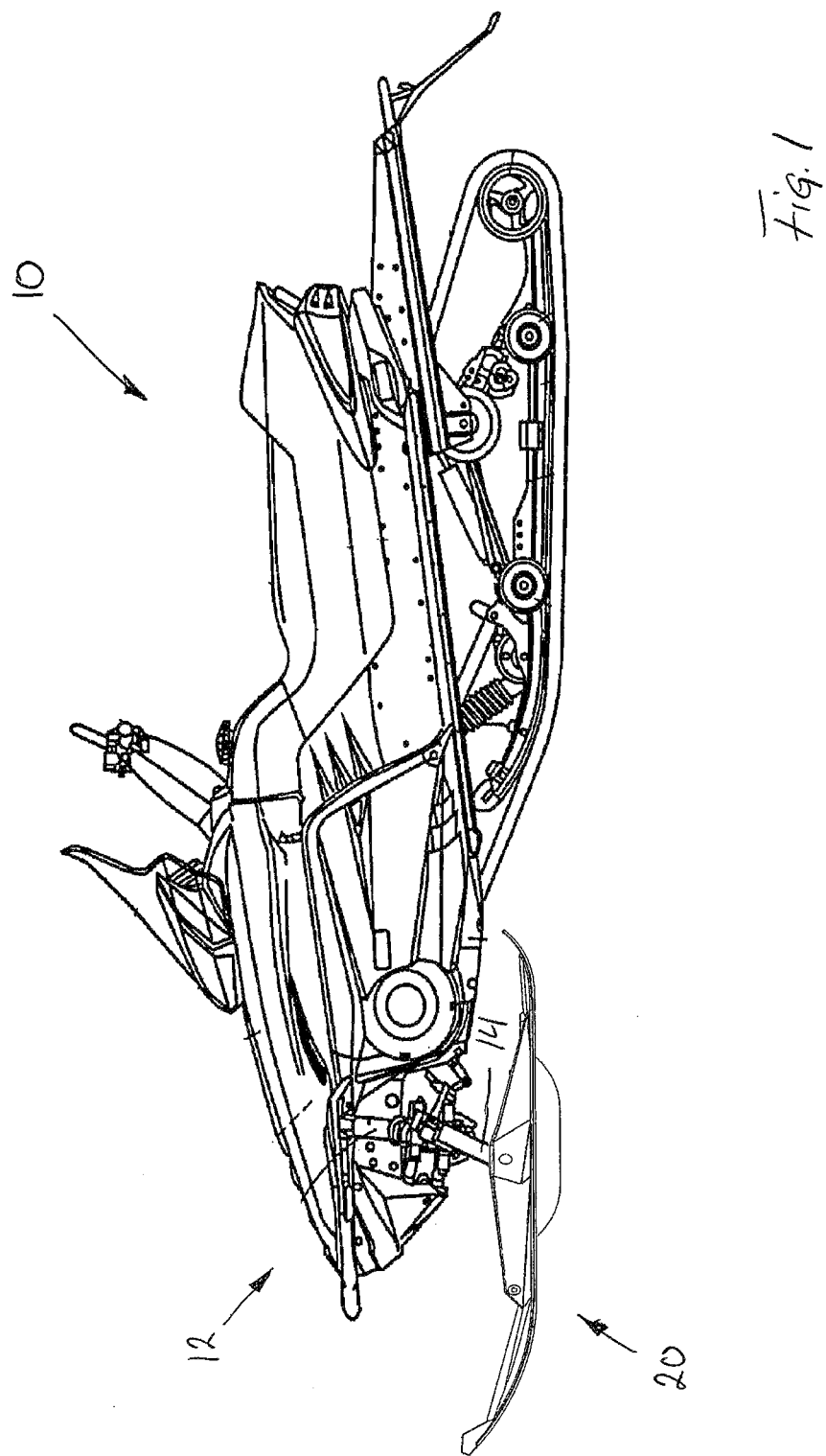
FIG. 1 is a side view of a snowmobile having mounted thereto a pair of steering skis in accordance with the principles of the present invention.
Figure 2:
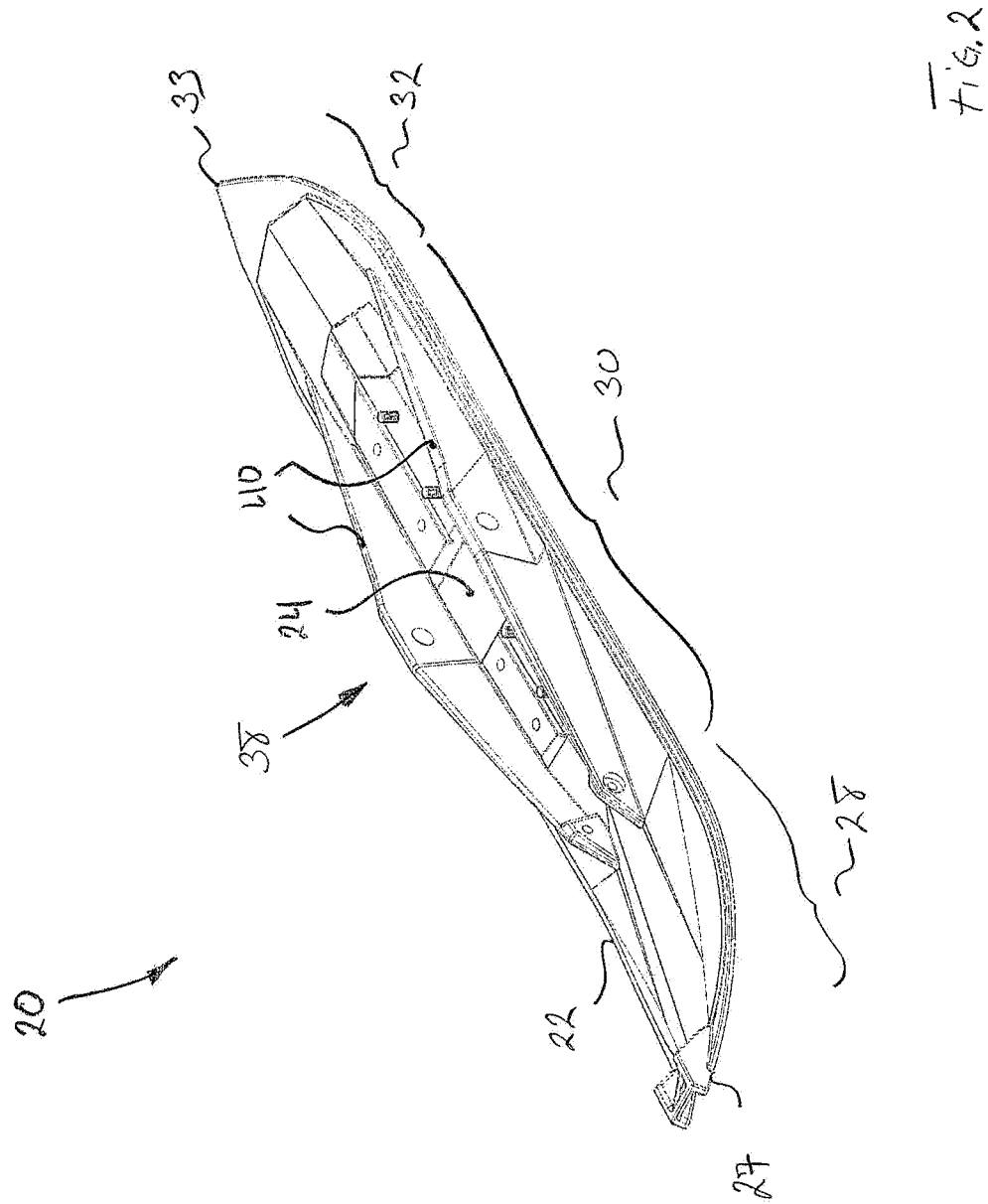
FIG. 2 is a front top perspective view of one of the steering skis of FIG. 1.
Figure 3:
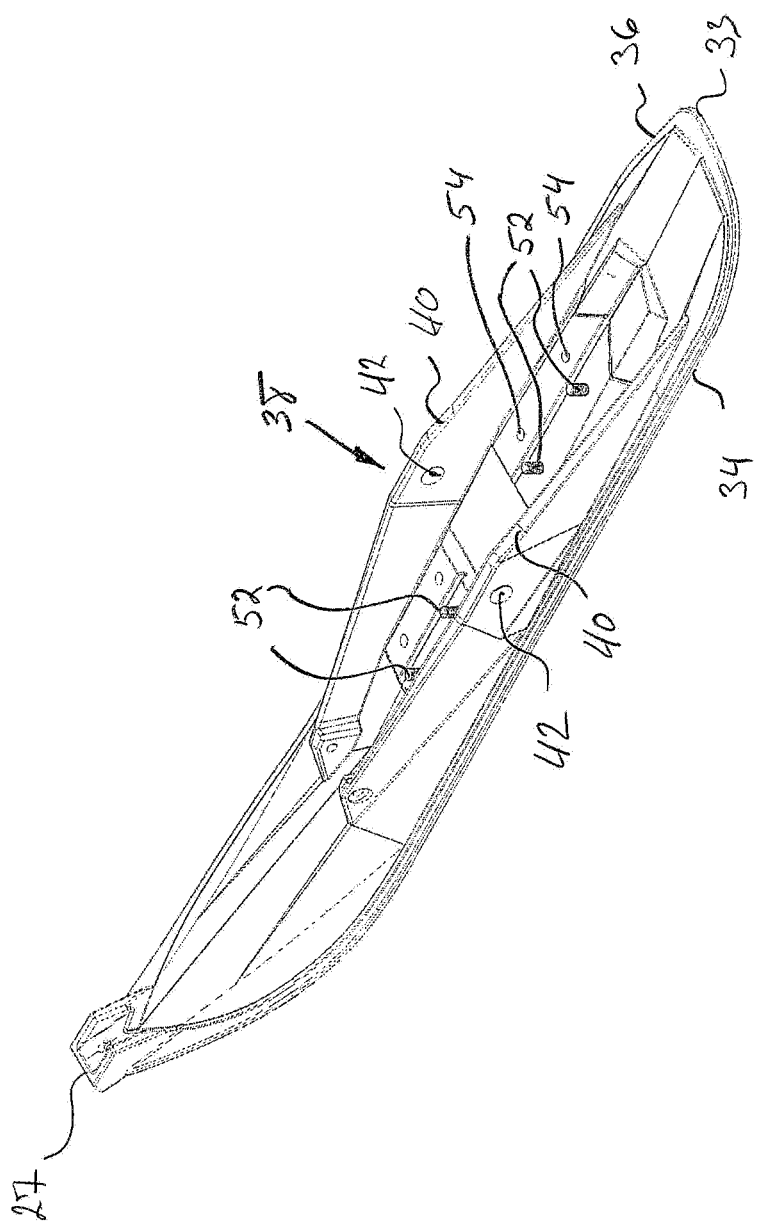
FIG. 3 is a rear top perspective view of the steering ski of FIG. 2.

Referring first to FIG. 1, snowmobile steering skis 20 made in accordance with the principles of the present invention are illustrated as mounted to the front portion 12 of a snowmobile 10. The steering skis 20 are generally respectively mounted to the front steering and suspension assemblies 14 of the snowmobile 10 in ways well-known in the art.

Referring now to FIGS. 2 to 9, one of the steering skis 20 is illustrated in more details.

The steering ski 20 comprises a main body 22 substantially made from polymeric material such as plastic (e.g. ultra high molecular weight polyethylene (UHMW)). Still, the body 22 of the ski 20 could be made of other materials such as, but not limited to, metallic material(s), composite material(s), etc. The body 22 generally comprises a top surface 24, a bottom (or running) surface 26, a front or forward portion 28, a generally central portion 30, and a rear or rearward portion 32.

The body 22 also defines a first (or right) side edge 34 and a second (or left) side edge 36 which generally define the overall width of the ski 20.

The top surface 24 is typically provided with a bracket or an assembly 38, mounted to the top surface 24 or integral therewith, which is configured to secure the ski 20 to the steering and suspension assembly 14 of the snowmobile 10 in a manner generally known in the art (see FIG. 1).

In the present embodiment, the bracket 38 comprises a pair of upwardly and longitudinally extending walls 40, integrally formed with the body 22, and each comprising an attachment aperture 42 configured to receive the pivoting pin (not shown) of the steering and suspension assembly 14 of the snowmobile 10.

Though not shown, the top surface 24 is also typically provided with a handle generally located near or at the front portion 28 of the ski 20. The handle is typically used to manually move the ski 20 and/or the snowmobile 10.

Figure 6:
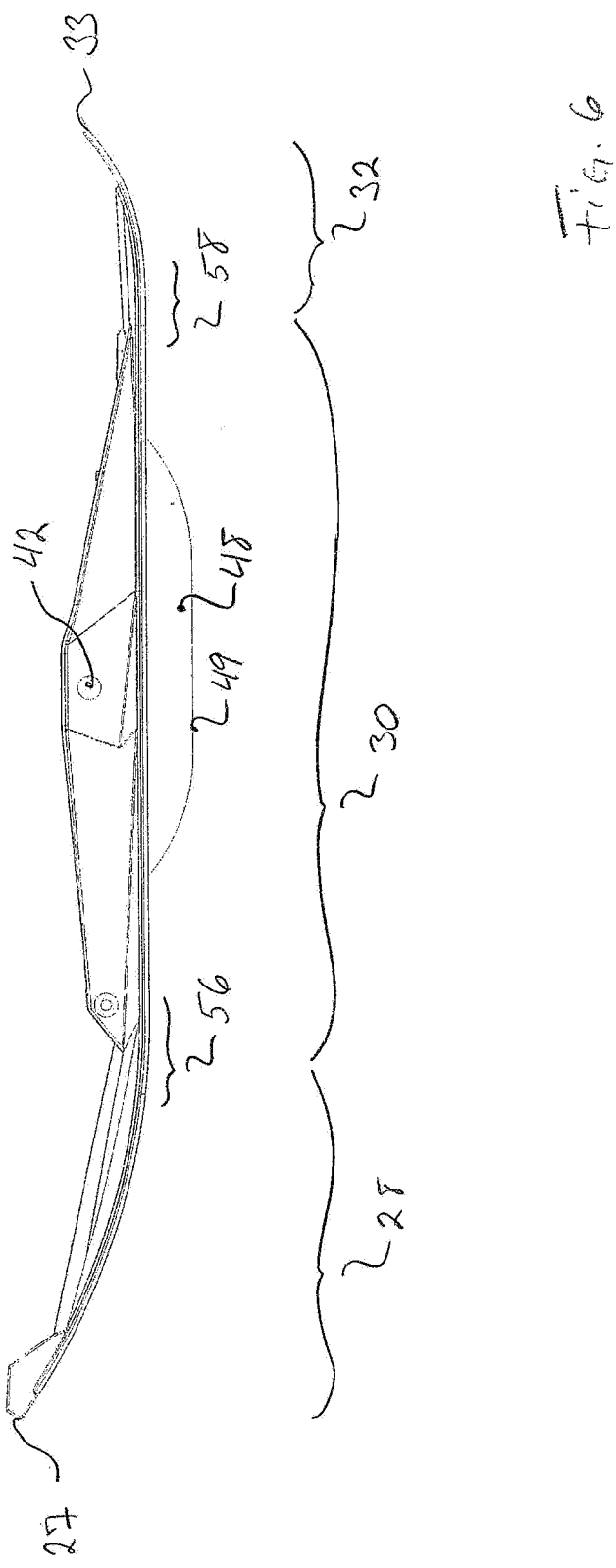
FIG. 6 is a side view of the steering ski of FIG. 2.
Figure 7:
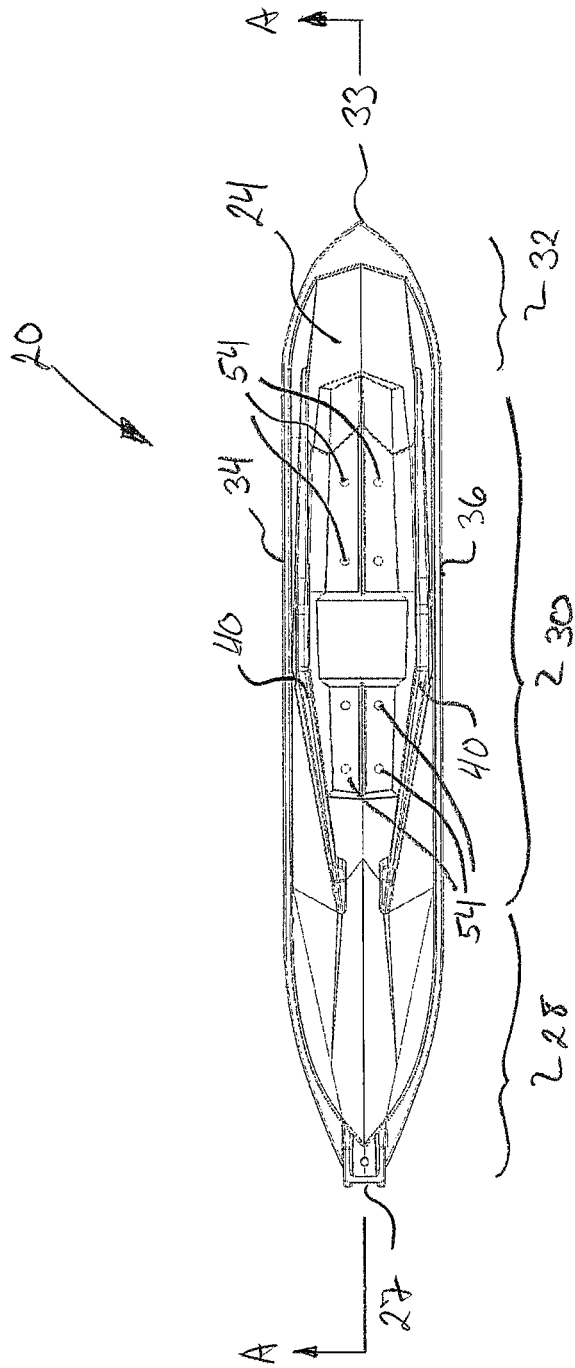
FIG. 7 is a top view of the steering ski of FIG. 2.

As best shown in FIG. 6, the front portion 28 of the body 22 is typically upwardly curved in order for the ski 20 to properly travel in or glide over the snow. The front portion 28 also generally tapers toward a front tip 27 (see also FIGS. 3 and 7).

For its part, the rear portion 32 of the body 22 may or may not be upwardly curved. In the present embodiment, the rear portion 32 is slightly upwardly curved in order to make it easier for the ski 20 to move backward when the snowmobile 10 is operated in reverse. As the front portion 28, the rear portion 32 also generally tapers toward a rear tip 33 (see FIGS. 2 and 7).

In the present embodiment, the radii of curvature of the front portion 28 and of the rear portion 32 are different and the radius of curvature of the front portion 28 is larger than the radius of curvature of the rear portion 32.

Referring to FIGS. 4, 5, 8 and 9, along the front portion 28, the central portion 30 and the rear portion 32, the bottom surface 26 exhibits different configurations.

Figure 4:
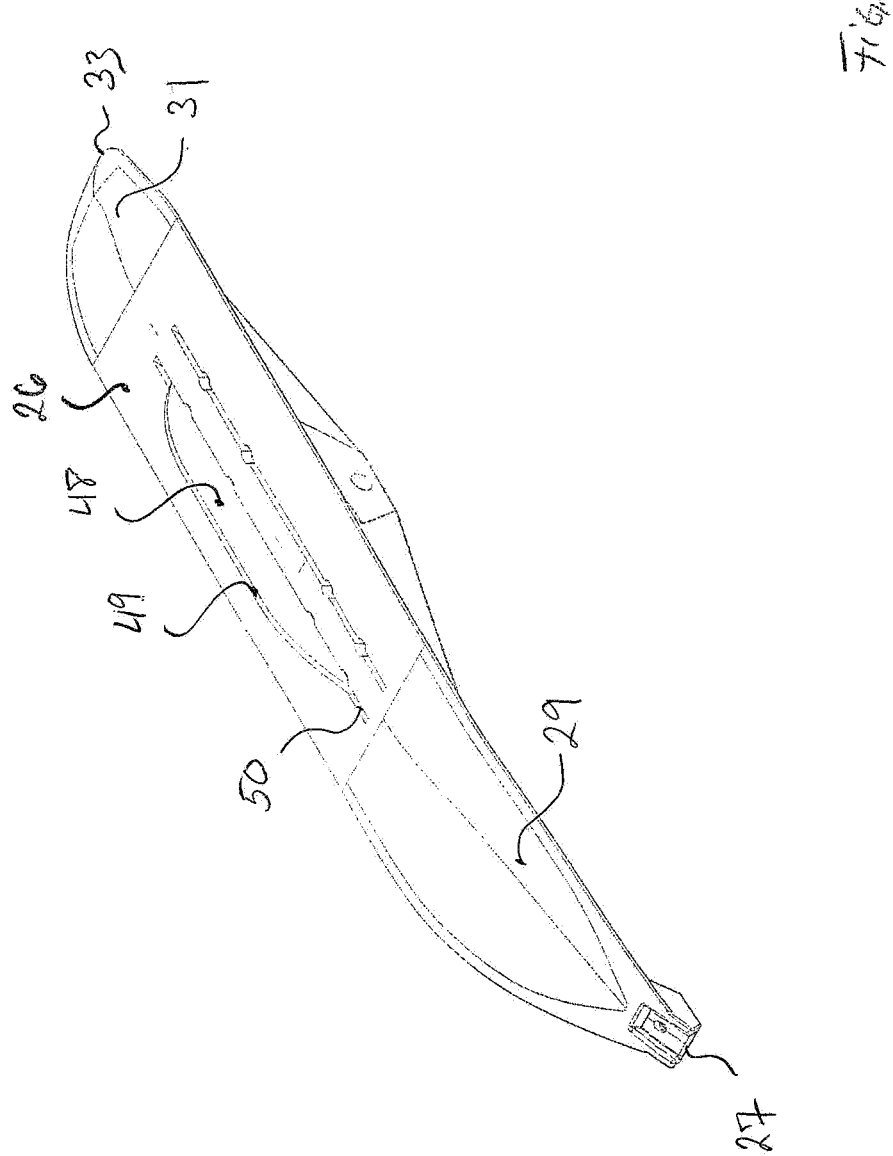
FIG. 4 is a front bottom perspective view of the steering ski of FIG. 2.
Figure 9:
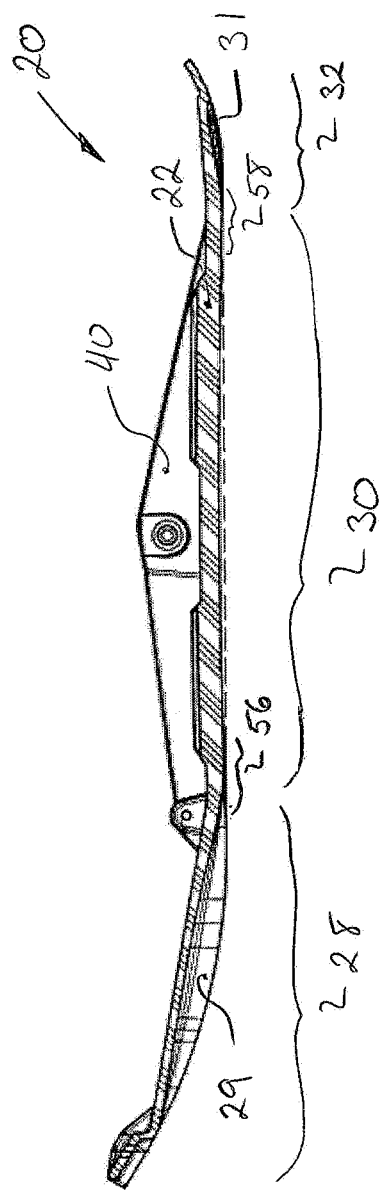
FIG. 9 is a cross-sectional side view of the steering ski of FIG. 2, along lines A-A of FIG. 7, without keel blade.

Along the front portion 28, the bottom surface 26 is slightly inwardly concave (see region 29 in FIGS. 4 and 9). This inwardly concave configuration generally allows the ski to better glide over the snow and to generally keep the snow under the ski 20.

Figure 8:
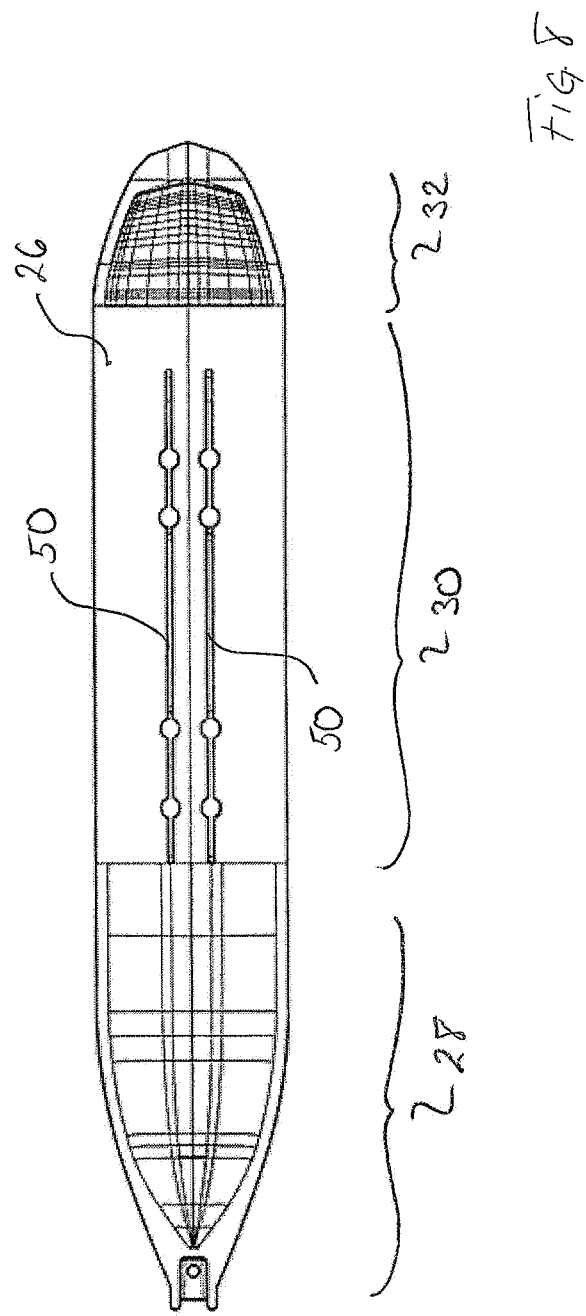
FIG. 8 is a bottom view of the steering ski of FIG. 2, without keel blade.

Along the central portion 30, the bottom surface 26 is substantially flat (see FIG. 8). However, as best shown in FIG. 9, the central portion 30 is slightly upwardly arched along the longitudinal direction of the ski 20. This upwardly arched configuration will be described in more details below.

Finally, along the rear portion 32, the bottom surface 26 is also slightly inwardly concave (see region 31 in FIGS. 4 and 9). This inwardly concave configuration also generally allows the ski to better glide over the snow and to keep the snow under the ski 20.

Figure 5:
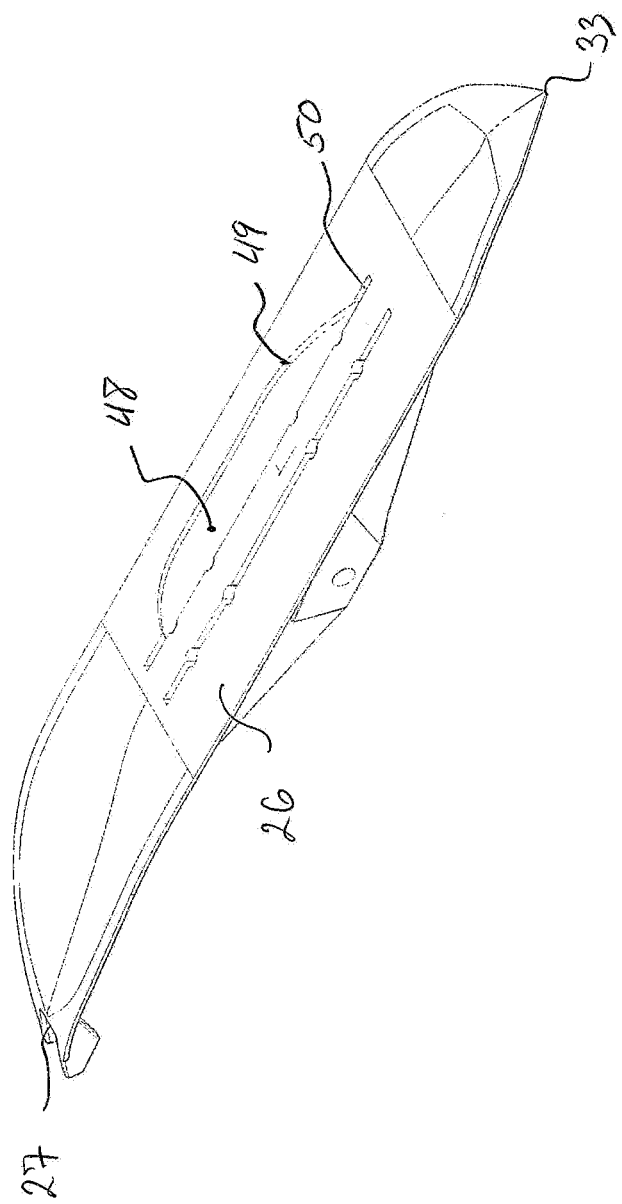
FIG. 5 is a rear bottom perspective view of the steering ski of FIG. 2.

In order to allow the ski 20 to steer properly, the ski 20 is provided with at least one keel blade 48 which extends downwardly from the bottom surface 26, generally in the central portion 30 thereof. The keel blade 48 also extends longitudinally along the length of the central portion 30 as best shown in FIGS. 4 to 6. Typically, but not necessarily, the keel blade 48 extends over more than 50% of the length of the central portion 30.

In the present embodiment, the keel blade 48 is removably mounted to the body 22 such that the keel blade 48 can be easily replaced and/or changed. In that sense, the central portion 30 of the body 22 is provided, in the bottom surface 26, with at least one longitudinally extending slot 50 suitably sized and shaped to removably receive the keel blade 48. To secure the keel blade 48 to the body 22, the top surface 24 of the body 22 is provided with several openings 54 which extend from the slot 50 and which are configured to receive the threaded extensions 52 of the keel blade 48 (see FIGS. 2 and 3). The threaded extensions 52 are configured to threadedly receive fasteners such as nuts in order to properly secure the keel blade 48 to the body 22 of the ski 20.

In the present embodiment, the body 22 comprises two laterally spaced-apart slots 50, each configured to receive one keel blade 48 as described above. However, in other embodiments, the body 22 of the ski 20 could comprise only one slot 50 or more than two slots 50. As best shown in FIG. 8, the two slots 50 are generally centrally located with respect to the width of the body 22.

Notably, though the body 22 of the ski 20 can comprise several slots 50, as in the present embodiment, it is not necessary that a keel blade 48 be installed in each of the slots 50 during use. Indeed, as shown in FIGS. 4-6, only one of the two slots 50 could be provided with a keel blade 48.

In that sense, in order to improve, or at least modify, the handling of the snowmobile 10, when only one keel blade 48 is mounted to the ski 20, the keel blade 48 could be mounted only in the outermost slot 50 of each ski 20, i.e. in the rightmost slot 50 on the right ski 20, and in the leftmost slot 50 on the left ski 20.

In addition, when the ski 20 comprises more than one slot 50, as in the present embodiment, it would be possible to mount different keel blades 48, i.e. keel blades 48 having different configurations, in each slot 50.

For instance, it would be possible to mount deeper keel blades 48 in the outermost slots 50 of the skis 20, and shallower keel blades 48 in the innermost slots 50 of the skis 20, or vice-versa, in order to provide improved steering. It would also be possible to mount longer keel blades 48, shorter keel blades 48, combination of longer and shorter keel blades 48, or even specific types of keel blades 48 (e.g. regular keel blades, deep-snow keel blades, racing keel blades, etc.) in the slots 50 of the skis 20 depending on the type of riding and/or snow conditions over which the skis 20 would be operated. Understandably, it would also be possible to mount substantially identical keel blades 48 in both slots 50.

Hence, having more than one slot 50 is generally beneficial as it allows more flexibility in the selection and installation of the keel blade(s) 48.

In the present embodiment, the keel blade 48 is typically made of metallic material such as, but not limited to, stainless steel. Still, the keel blade 48 could also be made other materials such as, but not limited, polymeric material(s), composite material(s), etc. It remains that the keel blade 48 is typically a wearing part and thus should preferably be made of resistant material(s). In that sense, in some embodiments, the keel blade 48 could be provided with carbide inserts (not shown), mounted along the edge 49 of the keel blade 48, in order to make the keel blade 48 more resistant to abrasion. Other forms of reinforcement could also be possible.

Also, as best shown in FIGS. 4 and 5, the keel blade 48 is relatively thin with respect to the overall width of the body 22. Such a thin keel blade 48 generally provides improved steering. Indeed, since the keel blade 48 is thin, the overall configuration of the bottom surface 26 is relatively flat. Notably, a relatively flat bottom surface 26 will have much less tendency to follow the tracks of a previous steering ski as the relatively flat bottom surface 26 will simply glide over the previous tracks. Also, a thin keel blade as keel blade 48 will generally cut and penetrate more easily into the snow, thereby allowing the keel blade 48 to remain into the snow when the snowmobile 10 is operated, even at high speed. Understandably, as the thin keel blade 48 cuts and, more importantly, stays into the snow, the steering ski 20 will be easier to steer and handle as the keel blade 48 will act as a rudder.

In addition, having a thin keel blade 48 generally allows the trace left in the snow by the keel blade 48 to be more easily erased as the trace is thinner. Having a thin keel blade 48 can also reduce darting.

In that sense, as best shown in FIGS. 4-6 and 9, and as already mentioned, the bottom surface 26 is slightly upwardly arched, mainly along the central portion 30, such as to define two pressure areas, a front pressure area 56, and a rear pressure area 58.

In the present embodiment, the front pressure area 56 is substantially located at the junction of the front portion 28 and the central portion 30. Similarly, the rear pressure area 58 is substantially located at the junction of the central potion 30 and the rear portion 32.

In addition, the rear pressure area 58 is located longitudinally behind the keel blade 48.

Due to the slightly arched configuration of the central portion 30, the front pressure area 56 and more particularly the rear pressure area 58 are configured to apply more pressure on the snow than the rest of the central portion 30.

Understandably, as the ski 20 travels over the snow, the at least one keel blade 48 will leave a trace in its wake. This trace, in some snow conditions, can cause darting as other snowmobiles use the same trail.

The rear pressure area 58 is thus configured to substantially fill back the trace left by the at least one keel blade 48 in order for the ski 20 to leave little or even no trace in its wake, thereby mitigating darting of following snowmobiles. In that sense, the rear pressure area 58 generally extends laterally over the full width of the steering ski 20.

During operation of the steering ski 20, the rear pressure area 58 will apply more pressure on the snow and will thus effectively push back at least some snow into the trace formed therein by the at least one keel blade 48.

Hence, when the ski 20 is operated, the snow will flow along the bottom surface 26 of the ski 20. As the snow meets the at least one keel blade 48, a trace will be formed therein. Then, as the snow reaches the rear pressure area 58, it will be pressed downwardly by the rear pressure area 58. This downward pressing of the snow will, in most snow conditions, substantially fill back the trace left by the at least one keel blade 48.

It is to be understood that in some conditions, the snow flowing under the ski 20 will behave substantially as a fluid. Hence, when the snow meets the rear pressure area 58, the downward pressure exerted thereby will force the snow back into the trace left by the at least one keel blade 48, thereby mostly erasing it.

The skilled addressee will understand that the rear pressure area 58 could be suitably sized to fill back, and ultimately substantially erase, most sizes of keel blade traces. However, in the present embodiment, as the keel blade 48 is thin, the trace it leaves in the snow will also be thin. Hence, due to its small size, the trace will be easier to fill back and substantially erase.

Hence, even though the thin keel blade 48 and the upwardly arched central portion 30 with its rear pressure area 58 could be used separately, their combination provides increased benefits over prior art steering skis as the thin trace left by the at least one keel blade 48 is easier to erase.

Figure 10:
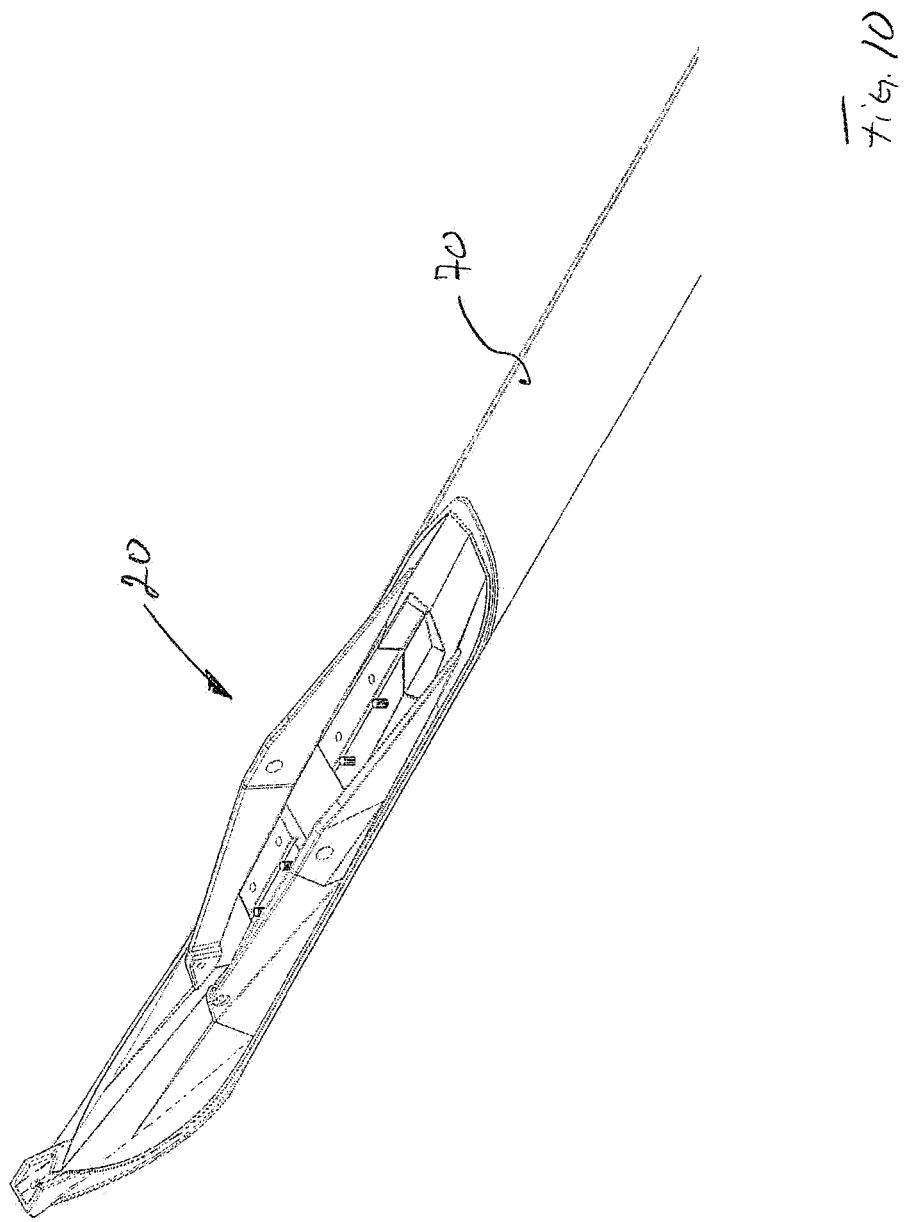
FIG. 10 is a rear top perspective view of the steering ski of FIG. 2, during use.
Figure 11:
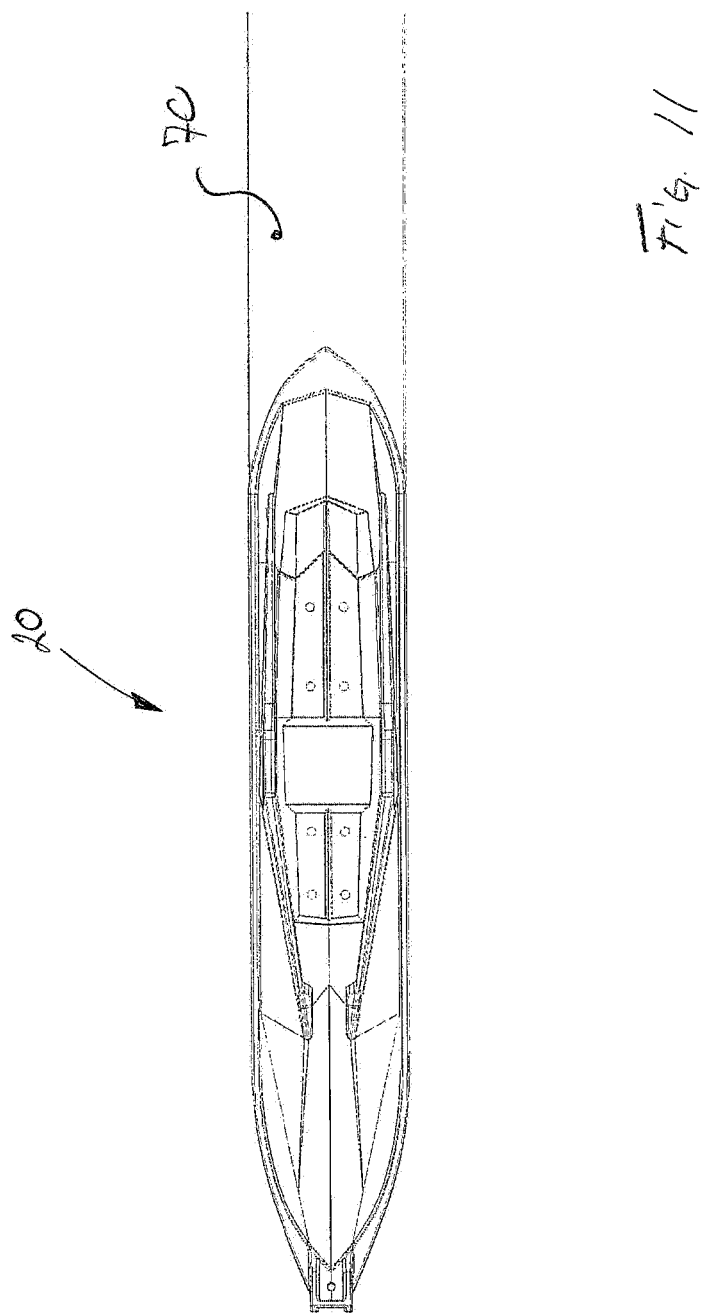
FIG. 11 is a top view of the steering ski of FIG. 2, during use.

In that sense, referring now to FIGS. 10 and 11, when the ski 20 is used in optimal snow conditions, the trace left by the at least one keel blade 48 is completely erased and the only trace left by the ski 20 is the wide and shallow trace 70 which more or less corresponds to the width of the ski 20. Understandably, the conditions of the snow and the speed at which the snowmobile 10 is operated will ultimately affect the ability of the rear pressure area 58 to substantially fill back the trace left by the at least one keel blade 48.

By substantially erasing the deep and narrow trace(s) left by the one or more keel blade(s) 48, the present embodiment of a steering ski 20 in accordance with the principles of the present invention provides a steering ski which generally reduces darting as subsequent skis only encounter wide and shallow traces 70.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A snowmobile steering ski comprising a main body extending longitudinally, the main body comprising a top surface configured to be secured to a snowmobile, a bottom surface, a first side edge and a second side edge, the main body comprising a front portion, a central portion, and a rear portion, the ski comprising at least one longitudinally extending keel blade extending downwardly from the bottom surface wherein the bottom surface of the central portion is longitudinally continuous and slightly longitudinally upwardly arched to define a front area and a rear pressure area.

2. A snowmobile steering ski as claimed in claim 1, wherein the bottom surface is slightly longitudinally upwardly arched to define a front area and a rear pressure area.

3. A snowmobile steering ski as claimed in claim 1, wherein the at least one keel blade extends longitudinally along the central portion.

4. A snowmobile steering ski as claimed in claim 2, wherein the at least one keel blade extends longitudinally between the front area and the rear pressure area.

5. A snowmobile steering ski as claimed in claim 1, wherein the bottom surface comprises at least one slot configured to removably receive the at least one keel blade.

6. A snowmobile steering ski as claimed in claim 3, wherein the main body has a first width, wherein the at least one keel blade has a second width, and wherein the second width is significantly thinner than the first width.

7. A snowmobile steering ski as claimed in claim 6, wherein the second width is less than 15% of the first width.

8. A snowmobile steering ski as claimed in claim 1, wherein the at least one keel blade is made from metallic material.

9. A snowmobile steering ski as claimed in claim 1, wherein the at least one keel blade comprises two longitudinally extending keel blades extending downwardly from the bottom surface, the two keel blades being laterally spaced apart.

10. A snowmobile steering ski as claimed in claim 9, wherein the two keel blades have different configurations.

11. A snowmobile steering ski as claimed in claim 9, wherein the bottom surface comprises two slots configured to respectively receive the two keel blades.

12. A snowmobile steering ski as claimed in claim 7, wherein the front portion is slightly concave along the bottom surface.

13. A snowmobile steering ski as claimed in claim 12, wherein the rear portion is slightly concave along the bottom surface.

14. A snowmobile steering ski as claimed in claim 1, wherein the main body is substantially made from polymeric material.

15. A snowmobile having secured thereto a pair of steering skis as claimed in claim 1.

16. A snowmobile steering ski comprising a main body extending longitudinally, the main body comprising a top surface configured to be secured to a snowmobile, a bottom surface, a first side edge and a second side edge, the main body comprising a front portion, a central portion, and a rear portion, the bottom surface comprising at least one longitudinally extending slot configured to removably receive at least one longitudinally extending keel blade wherein the bottom surface is longitudinally continuous and slightly longitudinally upwardly arched to define a front area and a rear pressure area.

17. A snowmobile steering ski as claimed in claim 16, wherein the bottom surface of the central portion is slightly longitudinally upwardly arched to define a front area and a rear pressure area.

18. A snowmobile steering ski as claimed in claim 16, wherein the at least one slot extends longitudinally along the central portion.

19. A snowmobile steering ski as claimed in claim 16, wherein the at least one slot extends longitudinally between the front area and the rear pressure area.

20. A snowmobile steering ski as claimed in claim 16, further comprising at least one keel blade removably received into the at least one slot.

21. A snowmobile steering ski as claimed in claim 20, wherein the main body has a first width, wherein the at least one keel blade has a second width, and wherein the second width is significantly thinner than the first width.

22. A snowmobile steering ski as claimed in claim 21, wherein the second width is less than 15% of the first width.

23. A snowmobile steering ski as claimed in claim 20, wherein the at least one keel blade is made from metallic material.

24. A snowmobile steering ski as claimed in claim 16, wherein the at least one slot comprises two slots, each of the two slots being configured to removably receive at least one keel blade.

25. A snowmobile steering ski as claimed in claim 24, wherein the two slots are laterally spaced apart.

26. A snowmobile steering ski as claimed in claim 24, further comprising at least one keel blade removably received into at least one slot of the two slots.

27. A snowmobile steering ski as claimed in claim 24, further comprising two keel blades respectively removably received into the two slots.

28. A snowmobile steering ski as claimed in claim 27, wherein the two keel blades have different configurations.

29. A snowmobile steering ski as claimed in claim 22, wherein the front portion is slightly concave along the bottom surface.

30. A snowmobile steering ski as claimed in claim 29, wherein the rear portion is slightly concave along the bottom surface.

31. A snowmobile steering ski as claimed in claim 16, wherein the main body is substantially made from polymeric material.

32. A snowmobile having secured thereto a pair of steering skis as claimed in claim 16.

33. A snowmobile steering ski comprising a main body extending longitudinally, the main body comprising a top surface configured to be secured to a snowmobile, a bottom surface, a first side edge and a second side edge, the main body comprising a front portion, a central portion, and a rear portion, the bottom surface being longitudinally continuous and slightly upwardly longitudinally arched to define a front area and a rear pressure area, the bottom surface comprising at least one longitudinally extending slot configured to removably receive at least one longitudinally extending keel blade and located between the front area and the rear pressure area.

34. A snowmobile steering ski as claimed in claim 33, further comprising at least one keel blade removably received into the at least one slot.

35. A snowmobile steering ski as claimed in claim 34, wherein the main body has a first width, wherein the at least one keel blade has second width, and wherein the second width is 15% of the first width.

36. A snowmobile steering ski as claimed in claim 34, wherein the front portion is slightly concave along the bottom surface, the rear portion is slightly concave along the bottom surface.

* * * * *